United States Patent
Keller

(10) Patent No.: US 10,766,175 B2
(45) Date of Patent: Sep. 8, 2020

(54) METHOD FOR PRODUCING A TRIM ELEMENT WITH A GENUINE CARBON APPEARANCE

(71) Applicant: HIB TRIM PART SOLUTIONS GMBH, Bruchsal (DE)

(72) Inventor: Bernd Keller, Karlsruhe (DE)

(73) Assignee: HIB TRIM PART SOLUTIONS GMBH, Bruchsal (DE)

(*) Notice: Subject to any disclaimer, the term of this patent is extended or adjusted under 35 U.S.C. 154(b) by 326 days.

(21) Appl. No.: 15/526,378

(22) PCT Filed: Nov. 4, 2015

(86) PCT No.: PCT/EP2015/075729
§ 371 (c)(1),
(2) Date: May 12, 2017

(87) PCT Pub. No.: WO2016/075015
PCT Pub. Date: May 19, 2016

(65) Prior Publication Data
US 2017/0348885 A1 Dec. 7, 2017

(30) Foreign Application Priority Data

Nov. 12, 2014 (DE) .................. 10 2014 116 483
Jan. 22, 2015 (DE) .................. 10 2015 100 925

(51) Int. Cl.
| | | |
|---|---|---|
| B29C 45/14 | (2006.01) | |
| B32B 5/12 | (2006.01) | |
| B32B 21/10 | (2006.01) | |
| C08J 5/04 | (2006.01) | |
| B60R 13/02 | (2006.01) | |
| B32B 5/02 | (2006.01) | |
| C08J 5/18 | (2006.01) | |
| B29C 45/16 | (2006.01) | |
| C08J 7/04 | (2020.01) | |
| B29K 707/04 | (2006.01) | |

(52) U.S. Cl.
CPC ........ B29C 45/14786 (2013.01); B29C 45/14 (2013.01); B29C 45/14008 (2013.01); B29C 45/14811 (2013.01); B29C 45/16 (2013.01); B32B 5/02 (2013.01); B32B 5/12 (2013.01); B32B 21/10 (2013.01); B60R 13/02 (2013.01); C08J 5/042 (2013.01); C08J 5/18 (2013.01); C08J 7/0427 (2020.01); B29C 2045/14713 (2013.01); B29C 2045/1692 (2013.01); B29K 2707/04 (2013.01); B32B 2307/40 (2013.01); C08J 2331/04 (2013.01); C08J 2333/06 (2013.01); C08J 2375/04 (2013.01); C08J 2400/24 (2013.01); C08J 2475/04 (2013.01)

(58) Field of Classification Search
CPC .................. B29C 45/14008; B29C 45/14786
See application file for complete search history.

(56) References Cited

U.S. PATENT DOCUMENTS

| | | | | | |
|---|---|---|---|---|---|
| 2,688,580 | A | * | 9/1954 | Fingerhut | B29C 70/00 156/314 |
| 5,094,883 | A | * | 3/1992 | Muzzy | B29C 70/50 264/131 |
| 5,108,458 | A | * | 4/1992 | Marumoto | D01F 11/14 423/447.1 |
| 5,356,576 | A | * | 10/1994 | Fischbach | B29C 45/14 264/257 |
| 6,083,855 | A | * | 7/2000 | Olson | B29C 70/546 427/294 |
| 2003/0080466 | A1 | * | 5/2003 | Cecchin | B29C 45/14467 264/259 |
| 2004/0167252 | A1 | * | 8/2004 | Melchiors | C08F 283/006 524/13 |
| 2004/0224093 | A1 | * | 11/2004 | Nishimura | B29B 15/125 427/372.2 |
| 2011/0274897 | A1 | * | 11/2011 | Dauner | B29C 70/088 428/203 |

FOREIGN PATENT DOCUMENTS

| | | |
|---|---|---|
| DE | 19723504 C1 | 10/1998 |
| DE | 202004003214 U1 | 7/2004 |
| DE | 102009006130 A1 | 7/2010 |
| WO | WO 2004/076506 A1 | 9/2004 |

OTHER PUBLICATIONS

International Search Report dated Mar. 10, 2016 issued in PCT/EP2015/075729.
Erwin Buerkle et al: "Integrative Verfahrenstechnik: SpritzgieBverfahren gestern, heute and morgen" Kunststoffe, vol. 2005, No. 5, 2005, pp. 51-56.

* cited by examiner

*Primary Examiner* — Matthew J Daniels
(74) *Attorney, Agent, or Firm* — Scully Scott Murphy and Presser

(57) ABSTRACT

The invention relates to a method for producing a trim element for vehicles which has a genuine carbon appearance, comprising a carbon fiber layer which is arranged on an exposed side of the trim element and is visible from the outside, and which is made of a fiber structure composed of prefabricated carbon fibers with interstices, with the method comprising at least the process step of wet impregnating the prefabricated carbon fiber layer with an aqueous polymer dispersion based on polyurethane, acrylate or polyvinyl acetate or a mixture thereof, so that the polymer dispersion penetrates at least partially into the carbon fiber layer, increasing the suitability thereof for penetration of a coating into the interstices of the fiber structure of the carbon layer.

14 Claims, No Drawings

METHOD FOR PRODUCING A TRIM ELEMENT WITH A GENUINE CARBON APPEARANCE

The invention relates to a method for producing a trim element for vehicles which has a genuine carbon appearance, comprising a carbon fiber layer that is arranged on an exposed side of the trim element and is visible from the outside.

Carbon fibers and carbon fiber layers are used in motor vehicle manufacturing primarily for fiber composite components. These components offer the advantage of high rigidity and low weight and are used to substitute or supplement steel and aluminum components. The carbon fibers or carbon fiber layers used in these cases typically receive an application of sizing or a reactive epoxy resin-based impregnation, which is then radially polymerized as a matrix material in a subsequent autoclaving process.

In addition to being used in fiber composite components, carbon fibers and carbon fiber layers are used as visible carbon fiber material, for example in trim elements/trim panels for vehicle interiors. Unlike fiber composite components, carbon fibers and carbon fiber layers that are used as visible carbon fiber materials are not impregnated because they will not be autoclaved; instead, they are applied untreated to a support structure, in most cases made of plastic, and are coated with a transparent top coat.

It has proven problematic in this process that the surface of the top coat layer always has a visible unevenness (waviness) or flatness imperfection following application, which can be smoothed out only through intense and time-consuming polishing to improve its visual appearance. Alternatively, a second topcoat layer had to be applied, however this is material-intensive, cost-intensive and time consuming, since it requires that the first layer must first be dry.

It has been discovered that the unevenness or flatness imperfection of the coating layer surface is a result of the fact that when the clear coat is applied to the carbon fiber layer, it does not adequately fill in the air-filled interstices that lie between the carbon fibers or carbon fiber bundles, and during the drying phase of the coating, this trapped air indirectly affects the surface quality. Above all, changes in the air volume due to temperature fluctuations or air movements and gas emissions play a significant role in this.

It is therefore the object of the invention to provide a method by which trim elements for motor vehicles can be produced with a visible carbon fiber appearance and improved surface coat quality.

This object is achieved by a combination of features according to claims 1 and 2.

According to the invention, the sized carbon fiber layer arranged on the exposed side so as to be visible from the outside is wet impregnated in advance with a polymer dispersion in order to improve the penetration of the coating, in particular of the clear coat, into interstices between the carbon fibers or carbon fiber bundles and to reduce the tendency of air to escape. This step also allows the primer application, which was previously necessary, to be dispensed with.

According to the invention, the method for producing the trim element with a genuine carbon appearance, comprising a sized carbon fiber layer which is arranged on an exposed side of the trim element and is visible from the outside, and which is made of a fiber structure composed of prefabricated carbon fibers with interstices, comprises the process steps of wet impregnating the prefabricated sized carbon fiber layer with an aqueous polymer dispersion based on polyurethane, acrylate or polyvinyl acetate or a mixture thereof, so that the polymer dispersion penetrates at least partially into the carbon fiber layer, thereby increasing the suitability thereof for a coating to penetrate into the interstices of the fiber structure of the carbon layer, and then drying the wet impregnated carbon fiber layer. The carbon fiber layer is then attached to a trim element substrate, oriented toward the exposed side of the trim element, and a coating layer is applied to the carbon fiber layer that is arranged on the trim element substrate, forming a transparent surface coating on the exposed side of the trim element, so that the coating penetrates into the interstices of the carbon fiber layer.

The wet impregnation of the prefabricated, sized carbon fiber layer with the aqueous polymer dispersion based on polyurethane, acrylate or polyvinyl acetate or a mixture thereof alters the surface structure of the carbon fibers or carbon fiber filaments, so that the coating becomes cross-linked with the carbon fiber layer and no air pockets remain.

Rather than wet impregnating the entire carbon fiber layer, an alternative embodiment of the method according to the invention involves wet impregnating the prefabricated, sized carbon fibers with an aqueous polymer dispersion based on polyurethane, acrylate or polyvinyl acetate or a mixture thereof, then drying the wet impregnated carbon fibers and weaving them to form a carbon fiber layer, which is then processed identically to the method described above.

The aqueous dispersion to be used, which is based on polyurethane, acrylate or polyvinyl acetate or a mixture thereof, has a solids content of 1-70%, more preferably 10-60%, even more preferably 25-50%.

Although this is principally not typical for visible carbon fiber elements, one variant nonetheless provides for a coating of primer to be applied to the carbon fiber layer to promote adhesion before the carbon fiber layer is placed on the trim element support.

For wet impregnation, the carbon fiber layer is preferably passed through a dispersion bath as an integral part of the production process, so that production takes place on a production line with seamlessly connected process steps. The carbon fiber layer is conveyed through the dispersion bath at a rate of 0.5-10 m/min, preferably at a rate of 1-2 m/min, with an immersion time of 10-60 s. Wet impregnation is carried out such that, depending on the type of weave, the carbon fiber layer experiences an increase in weight per unit area of 1 to 50 $g/m^2$, preferably of 5 to 20 $g/m^2$.

Following wet impregnation, the drying step is advantageously carried out in a drying zone at a temperature of 20-120° C., particularly preferably 60-120° C. Like the passage through the disperson bath, a drying zone allows the drying step to be integrated into the production process within the same production line.

In a first alternative, the wet impregnated and dried carbon fiber layer is mounted onto the trim element support by lamination. In a second alternative, mounting is accomplished by injecting the trim element support onto the back of the carbon fiber layer by injection molding. In that case, the trim element support on which the carbon fiber layer has been mounted may also be subjected to integrated three-dimensional shaping processes. Wet impregnation with said polymer dispersions further reinforces the fibers and the sliding properties thereof, and reduces the tendency of the carbon fibers to break during laminating and shaping processes.

In an advantageous variant, the coating layer is applied by pouring it over the carbon fiber layer. The coating layer is advantageously composed of a two-component polyurethane casting system, in which both aromatic or aliphatic and lightfast and non-lightfast polyurethane coatings may be used.

The method can be implemented in a particularly cost-effective manner if the carbon fibers are processed as individual fibers or as fiber bundles, or if the woven carbon fiber fabric is processed as rolled material in a process integrated into the production process, i.e. drawn from a roll, wet impregnated, dried and either rewound onto a roll or immediately cut to size, based on the size of the trim element support, for placement of the carbon fiber layer on the trim element support.

In a further variant, it is provided that the carbon fiber layer additionally comprises a supporting fabric, so that the carbon fiber layer can be more easily processed and positioned on the trim element support.

In addition to the above method steps, optional steps are carried out, such as milling the trim element after the coating has been applied and polishing the surface, in which case the use of the method according to the invention results in a reduction many times over of the polishing effort that is required.

Other advantageous refinements of the invention are characterized in the dependent claims. The invention is not limited to the preferred exemplary embodiments described above. A number of variants are conceivable which make use of the described solution even in fundamentally different configurations. For example, the carbon fiber layer may be laminated manually or by machine. The trim element support may be made of injection molded material or wood laminate.

The invention claimed is:

1. A method for producing a trim element for vehicles which has a genuine carbon appearance, comprising a sized carbon fiber layer which is arranged on an exposed side of the trim element and is visible from the outside, and which is made of a fiber structure composed of prefabricated carbon fibers with interstices, comprising the following process steps:
    wet impregnating the prefabricated, sized carbon fiber layer with an aqueous polymer dispersion based on polyurethane, acrylate or polyvinyl acetate or a mixture thereof, so that the polymer dispersion penetrates at least partially into the carbon fiber layer, increasing the suitability thereof for penetration of a coating into the interstices of the fiber structure of the carbon layer, wherein the wet impregnation alters the surface structure of the carbon fibers or carbon fiber filaments of the prefabricated, sized carbon fiber layer, so that the coating becomes cross-linked with the carbon fiber layer and no air pockets remain,
    drying the wet impregnated carbon fiber layer,
    affixing the carbon fiber layer onto a trim element support, aligned toward the exposed side of the trim element,
    applying a coating layer to the carbon fiber layer that is arranged on the trim element support, in order to form a transparent surface layer on the exposed side of the trim element, with coating material penetrating into the interstices of the carbon fiber layer and wherein for wet impregnation, the carbon fiber layer is passed through a dispersion bath as an integral part of the production process,
    wherein the carbon fiber layer is mounted onto the trim element support by lamination, and the carbon fiber layer additionally comprises a supporting fabric.

2. The method according to claim 1 wherein the aqueous dispersion has a solids content of 1-70%.

3. The method according to claim 1, wherein a coating of primer is applied to the carbon fiber layer to promote adhesion before the carbon fiber layer is placed on the trim element support.

4. The method according to claim 1, wherein drying is carried out in a drying zone at a temperature of 20-120° C., to a residual moisture of less than 1%.

5. The method according to claim 4, wherein drying is carried out in the drying zone at a temperature of 60-120° C.

6. The method according to claim 1, wherein the trim element support is injected onto the back of the carbon fiber layer.

7. The method according to claim 1, wherein the coating layer is applied by pouring it over the carbon fiber layer.

8. The method according to claim 1, wherein the carbon fiber layer is conveyed through the dispersion bath at a rate of 0.5-10 m/min, m/min, with an immersion time of 10-60 seconds.

9. The method according to claim 8, wherein the carbon fiber layer is conveyed through the dispersion bath at a rate of 1-2 m/min.

10. The method according to claim 1, wherein the carbon fiber layer is composed of individual fibers, fiber bundles or a woven carbon fiber fabric.

11. The method according to claim 10, wherein the individual fibers, the fiber bundles or the woven carbon fiber fabric in the form of rolled material are wet impregnated in a process integrated into the production process and then cut to size based on the size of the trim element support, for placement of the carbon fiber layer on the trim element support.

12. The method according to claim 1, wherein the coating layer is composed of a two-component polyurethane.

13. The method according to claim 1, wherein the aqueous dispersion has a solids content of 10-50%.

14. A method for producing a trim element for vehicles which has a genuine carbon appearance, comprising a sized carbon fiber layer which is arranged on an exposed side of the trim element and is visible from the outside, and which is made of a fiber structure composed of prefabricated carbon fibers with interstices, comprising the following process steps:
    wet impregnating the prefabricated, sized carbon fibers with an aqueous polymer dispersion based on polyurethane, acrylate or polyvinyl acetate or a mixture thereof, so that the polymer dispersion penetrates at least partially into the carbon fibers, increasing the suitability thereof for penetration of a coating into the interstices of the fiber structure of the carbon layer, wherein the wet impregnation alters the surface structure of the carbon fibers or carbon fiber filaments of the prefabricated, sized carbon fiber layer, so that the coating becomes cross-linked with the carbon fiber layer and no air pockets remain,
    drying the wet impregnated carbon fibers,
    weaving the wet impregnated and dried carbon fibers into the carbon fiber layer,
    affixing the carbon fiber layer onto a trim element support, aligned toward the exposed side of the trim element,
    applying a coating layer to the carbon fiber layer that is arranged on the trim element support, in order to form a transparent surface layer on the exposed side of the trim element, with coating material penetrating into the interstices of the carbon fiber layer, wherein the carbon fiber layer is mounted onto the trim element support by lamination, and the carbon fiber layer additionally comprises a supporting fabric.

* * * * *